Figure 1:
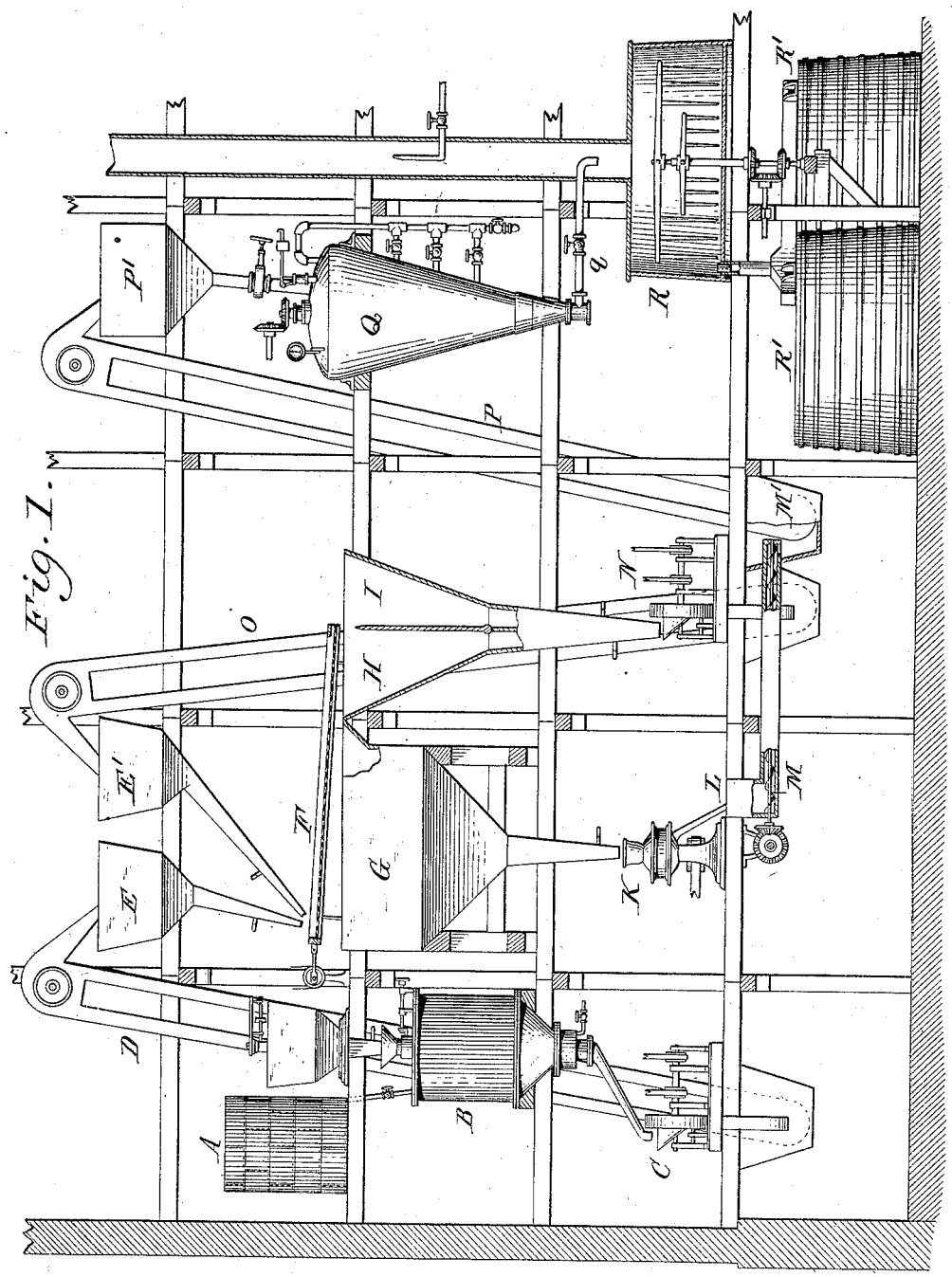

(No Model.)  J. C. SCHUMAN.  2 Sheets—Sheet 1.

METHOD OF TREATING AND PREPARING STARCH.

No. 316,406.  Patented Apr. 21, 1885.

(No Model.) 2 Sheets—Sheet 2.

J. C. SCHUMAN.
METHOD OF TREATING AND PREPARING STARCH.

No. 316,406. Patented Apr. 21, 1885.

Witnesses:
Chas. J. Buchheit
Theo. L. Popps

John C. Schuman Inventor.
By Wilhelm & Bonner
Attorneys.

UNITED STATES PATENT OFFICE.

JOHN C. SCHUMAN, OF AKRON, ASSIGNOR TO WILLIAM T. JEBB, OF BUFFALO, NEW YORK.

METHOD OF TREATING AND PREPARING STARCH.

SPECIFICATION forming part of Letters Patent No. 316,406, dated April 21, 1885.

Application filed March 23, 1885. (No specimens.)

*To all whom it may concern:*

Be it known that I, JOHN C. SCHUMAN, of Akron, in the county of Erie and State of New York, have invented new and useful Improvements in the Method of Preparing and Treating Starch, of which the following is a specification.

This invention relates to an improvement in the treatment of Indian corn or maize for extracting the starch therefrom, and for producing a mash suitable for the manufacture of distilled spirits.

A kernel of Indian corn or other grain consists of three principal parts—viz., the inner portion or body, which consists, principally, of starch-cells; the outer inclosing skin or husk and its glutinous lining, which consist of wood fiber, nitrogenous compounds, albumen, and oil, which are useful for cattle-feed, and the germ or chit, which is located at the small or cob end of the kernel, and is very rich in oil, the latter constituting about seventy per cent. of its component parts. In manufacturing distilled spirits from Indian corn it has been heretofore and it is now the general practice to crush or grind the grain, and to mash, ferment, and distill all these constituent parts of the crushed or ground grain together, whereby a large amount of impurities or deleterious substances contained in or emanating from the husks and germs are mixed with the spirits, from which they must be afterward removed, partly by rectification, and in the case of the more volatile impurities—such as fusel-oil—by the slow process of aging. It has also been customary in some localities to strain the mash before fermenting, and thereby removing the husks and other coarse particles from the wort or liquid to be fermented, whereby the objectionable results flowing from the presence of these coarse particles during the fermentation and distillation are, to a certain extent, avoided, without, however, avoiding the effects of the presence of the more finely-reduced portions of the husks and germs which cannot be strained out, and of the oily ingredients which have become mixed with the liquid, and which will produce the above-mentioned difficulties. It has also been proposed to manufacture distilled spirits from starch made in the usual manner; but this is impracticable, because such starch is very expensive, and the quantity of starch so obtained from a bushel of corn does not produce even the ordinary yield of spirits which is obtained from a bushel of corn by the ordinary methods, while the use of starch-liquid or crude starch suspended in water is impracticable on account of the large amount of water which it contains, and which reduces the yield to a fraction of the compulsory production fixed by law.

The object of this invention is to avoid these difficulties by thoroughly removing the husks or skins and the germs or chits from the starchy granules before developing the starch; and my invention consists of the improvements which will be hereinafter fully described, and pointed out in the claims.

Figure 2:
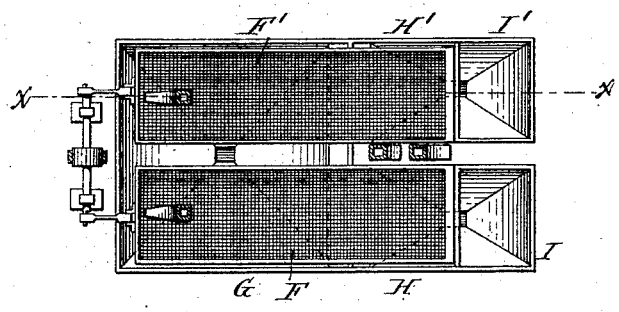
Figure 3:
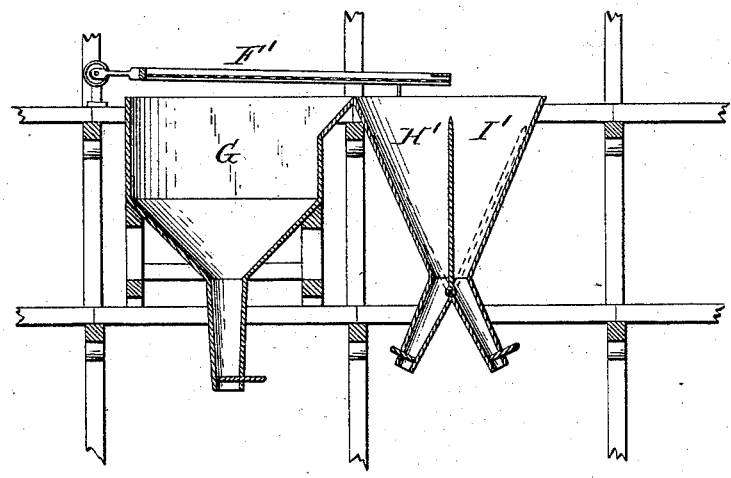

In the accompanying drawings, consisting of two sheets, Figure 1 is a sectional elevation of a plant of machinery by which my invention is practiced. Fig. 2 is a top plan view of the separating-sieves. Fig. 3 is a vertical section in line *x x*, Fig. 2.

Like letters of reference refer to like parts in the several figures.

A represents a water-tank, which contains hot water used for steeping the corn.

B represents a tank or vat in which the corn is steeped, and which is supplied with water from the tank A and constructed with a perforated false bottom for draining. The corn is steeped in this tank at a temperature of about 140° Fahrenheit for about fifteen hours, whereby the grain becomes expanded or swelled. This temperature is maintained in the steeping-tank by renewing the water from time to time. When the corn has been steeped, the starchy body of each kernel has become enlarged, pulpy, and soft, and the germ has become similarly enlarged and tends to separate itself by reason of its oily character from the surrounding portions of the starchy body which has become saturated with water, and the husk or skin has become tough and tends to separate, together with its glutinous lining, from the starchy body and oily germ. In steeping the corn care is taken that the temperature does not rise to 155° Fahrenheit, at which temperature the sacks of the starch-cells begin to burst and discharge their contents. When the corn has been steeped, the warm water is drained off and cold water is introduced into the tank B, whereby the corn is chilled and the skins or husks are further toughened and the oily germs further loosened from the surrounding portions of the starchy bodies. The water is then drained off from the corn in the tank B.

C represents a reducing-machine, which receives the steeped corn from the tank B, and in which the grain is whipped or beaten, whereby the husks or skins and their glutinous linings are opened and stripped in large flakes from the inner starchy bodies and from the germs, the starchy bodies being at the same time reduced to fine granules, while the germs are detached from the starchy portions and skins without being broken. The reducing-machine C consists of several concentric rows of beaters revolving at a high speed in opposite directions within an inclosing-case. In order to facilitate the discharge of the material from this machine, the outer row of beaters is provided with one or more scrapers, which prevent the material from adhering to the inner side of the inclosing-case of the machine. The reduced material is discharged from the reducing-machine C into the foot of an elevator, D, whereby it is conducted to a receiving-hopper, E.

F represents a separating-screen, which receives the reduced material from the hopper E, and separates the same into three products—viz., the fine fragments or granules of crude starch, the germs of which are somewhat larger in size, and the flakes of skins or husks and glutinous linings, which are still larger. To this end the screen is clothed for about two-thirds of its length from its head with fine wire-cloth, which permits only the starch-granules to pass through, and for the remainder of its length with coarse wire-cloth, which permits the germs to pass through, while the skins or coarse offal escape over the tail of the screen.

G represents a receiver which collects the starchy material which passes through the upper finely-clothed portion of the screen.

H represents a receiver which collects the germs passing through the lower coarsely-clothed portion of the screen, and I is a receiver which collects the skins escaping over the tail of the screen.

K represents a reducing-mill, which receives the material from the receiver G, and in which the material is further reduced to a higher degree of fineness. The mill preferably employed for this purpose is known as the "Bogardus" mill, and consists, essentially, of two serrated or grooved disks having a slight eccentric movement with reference to each other, whereby the gumming or clogging of the disks by the material is avoided.

L is a receiver which receives the ground material from the mill K, and M is a conveyer, whereby the ground material is conducted to a receiver, M', from which it is elevated by an elevator, P, to a receiving-hopper, P'.

N is a supplementary reducing-machine, constructed like the machine C, in which the steeped grain is reduced, and receiving the husks and germs, either or both, from the hoppers H and I for the purpose of detaching from these products of the separation any starch particles which may adhere to the same, if such further treatment is necessary or desirable. The reduced material coming from the machine N is conducted by an elevator, O, into a hopper, E', from which it is spouted upon a separating-screen, F', which is arranged on one side of the screen F, and which effects a separation of the detached meal from the germs and skins, the meal passing into the receiver G and the germs and skins into receivers H' and I'.

Q represents a closed developing tank or vessel, which receives the meal from the hopper P', and in which the meal is boiled under pressure and at a high temperature, for the purpose of developing the starch and preparing the same for mashing. The tank Q is provided with a revolving agitator or stirrer and with suitable steam-pipes, a safety-valve, and a pressure-gage for regulating the process of developing the starch. In this tank the meal is mixed with water and boiled under a pressure of about forty pounds to the square inch for several hours, until the starch has been fully developed. The process of developing the starch proceeds rapidly and uniformly, because the meal under treatment has been freed from the coarse refuse, and consists of fine starch-granules of uniform size, whereby the heat is enabled to act uniformly upon all the starch particles under treatment, thereby preventing the formation of lumps or aggregations of partly-developed starch, and rendering the mixture much less liable to be scorched or burned, which latter condition is fatal to a successful prosecution of the subsequent operations of distilling.

R represents a mash-tub, which receives the developed starch-liquid from the tank Q by a pipe, $q$, and in which the starch is mashed by the addition of rye at a temperature of about 150° Fahrenheit and the subsequent addition of malt at a temperature of about 135° Fahrenheit.

R' represents the fermenting-tubs which receive the mash from the mash-tub R, and in which the mash is fermented by the addition of yeast. The fermented beer derived from the fermenting-tubs R' is distilled in a still of any ordinary or suitable construction.

The meal which is treated in the developing-tank, and afterward mashed and fermented, consists of the starchy portions of the kernels freed from the inclosing-skins, glutinous linings, and oily germs, whereby the liberation of impurities during the process of developing the starch and fermenting is avoided, thereby producing a purer product than heretofore, while preserving the separated skins and germs in a condition in which they can be readily utilized as feed for cattle, &c., either by immediate consumption, or, when not required for immediate use, after drying, which can be done at small expense, as these products contain but a small percentage of moisture. The process of developing the starch and mashing and fermenting the same is conducted more rapidly and with a smaller expenditure of power and heat than heretofore, owing to the exclusion of the coarse offal from this process, and the capacity and size of the apparatus can be correspondingly reduced.

During the process of fermenting, the absence of the coarse offal avoids great and sudden changes in temperature, thereby permitting the material to be kept very closely to the maximum temperature at which the yeast is most effective without danger of acetic acid being formed, whereby the yield is increased.

It is obvious that the arrangement of the parts of the apparatus may be modified in accordance with the space at disposal and the general form or character of the building in which it is placed.

I claim as my invention—

1. The herein-described method of preparing the mash, which consists in steeping the corn, then separating the starchy portions of the kernels from the husks, gluten, and germs by whipping or beating without water, and then sifting and mashing the separated starch-meal, substantially as set forth.

2. The herein-described method of preparing the mash, which consists in steeping the corn, then separating the skins and germs from the starchy portions of the kernels by whipping or beating without water, and then sifting, then boiling the starchy portions under pressure to develop the starch, and then mashing the developed starch, substantially as set forth.

Witness my hand this 21st day of March, 1885.

JOHN C. SCHUMAN.

Witnesses:
S. B. GOODALE,
JOHN T. ABBOTT.